(12) United States Patent
Uskolovsky

(10) Patent No.: US 11,685,548 B2
(45) Date of Patent: Jun. 27, 2023

(54) HYBRID TRANSPORTATION

(71) Applicant: Alexander Uskolovsky, Los Angeles, CA (US)

(72) Inventor: Alexander Uskolovsky, Los Angeles, CA (US)

(\*) Notice: Subject to any disclaimer, the term of this patent is extended or adjusted under 35 U.S.C. 154(b) by 0 days.

(21) Appl. No.: 17/402,572

(22) Filed: Aug. 15, 2021

(65) Prior Publication Data
US 2022/0002000 A1  Jan. 6, 2022

Related U.S. Application Data

(62) Division of application No. 16/405,053, filed on May 7, 2019, now Pat. No. 11,155,362.

(51) Int. Cl.
| | |
|---|---|
| *B64C 39/02* | (2023.01) |
| *B64F 1/10* | (2006.01) |
| *B64D 27/24* | (2006.01) |
| *B64B 1/66* | (2006.01) |
| *B64D 9/00* | (2006.01) |

(52) U.S. Cl.
CPC ............... *B64F 1/10* (2013.01); *B64B 1/66* (2013.01); *B64C 39/022* (2013.01); *B64D 9/00* (2013.01); *B64D 27/24* (2013.01); *B64C 39/024* (2013.01)

(58) Field of Classification Search
CPC . B64F 1/10; B64B 1/66; B64C 39/022; B64C 39/024; B64D 9/00; B64D 27/24
See application file for complete search history.

(56) References Cited

U.S. PATENT DOCUMENTS

2016/0230350 A1\*  8/2016  Bambrogan ............. B63B 27/28
2018/0057018 A1\*  3/2018  Suppes ................. B64C 39/022

\* cited by examiner

*Primary Examiner* — Michael C Zarroli
(74) *Attorney, Agent, or Firm* — Elie Gendloff

(57) ABSTRACT

Provided is a transportation system comprising a hybrid vehicle that is propelled on a highway by a linear induction electric motor comprising a stationary motor element ("stator") and a moving motor element ("rotor"), where the stator is incorporated into a groove in the highway and the rotor is incorporated into the hybrid vehicle and protrudes into the groove in the highway; and where the hybrid vehicle further comprises at least one wing that elevates the hybrid vehicle when propelled to a take-off speed on the highway. Methods of transportation utilizing this hybrid vehicle transportation system are further provided.

6 Claims, 5 Drawing Sheets

HYBRID TRANSPORTATION

CROSS-REFERENCE TO RELATED APPLICATIONS

This is a division of application Ser. No. 16/405,053, filed 2019, May 7, with title "Hybrid Air Transportation" and naming Alexander Uskolovsky as inventor, the entire content of which is hereby incorporated herein by reference.

BACKGROUND OF THE INVENTION

(1) Field of the Invention

The present invention generally relates to transportation systems. More specifically, the transportation systems utilizing at least some propulsion means located beyond a transportation vehicle in order to move people and/or cargo.

(2) Description of the Related Art

Currently, there are only four distinct modes of mass transportation for passengers and cargo. These include: road transportation, which is inexpensive but slow and generally not environmentally sound; air transportation, which is fast, but expensive and not environmentally sound at all; rail transportation, which is typically environmentally sound, but very expensive and slow; and water transportation, which is cheap but typically very slow and usually not environmentally sound.

High Speed Rail systems have attempted to combine the speed of air transportation and environmental soundness of the electric railroad. However, huge construction and maintenance costs make this transportation mode extremely expensive and ultimately economically not viable.

New developments in evacuated tube transport technologies (i.e., a HyperLoop) have revealed major issues and technical challenges that will very likely take years of research and development and billions of dollars to address and overcome, if at all.

These issues include, to name a few: evident safety concerns, such as the possibility of a failure of the thin 1 mm air cushion under the pod at the 1,000 km/hour speed that would cause severe imminent fire due to a huge imposed friction, let alone intolerable deceleration, inside the tightly sealed metal tube with no exit for hundreds of miles; the lack of the positional stability of the rapidly moving pod inside the tube due to the air cushion with practically no friction that provides the crucial benefit to this technology and, at the same time, makes the pod's stabilization unfeasible which leads to highly unsafe situation as the pod's plane rotor must enter into the stator slot of the linear electric motor having just a 20 mm gap at 1,000 km/hour speed; sustaining low pressure in hundreds of miles of the tube, which has never before been reduced to practice; also the enormous minimal radius of turns (20 km at this speed) being required to limit the side accelerations on the passengers to below tolerable 0.5 g.

These major issues defer the possibility of implementation of the Evacuated Tube Transport Technologies as a feasible mode of transportation until and if the technology can successfully address at least these issues.

Therefore, there is a current need for modes of transportation that combine the benefits of the current developed modes of transportation without the negative effects of each. Such a new public transportation system needs to be safe, reliable, well tried, inexpensive, fast, and environmentally friendly. The present invention meets these needs.

BRIEF SUMMARY OF THE INVENTION

The present invention is directed to a hybrid air transportation system for transporting passengers and/or cargo safely, quickly, inexpensively, and in an environmentally friendly way.

Thus, in some embodiments, the invention is directed to a transportation system. The transportation system comprises (a) a ground-based powered vehicle, (b) at least one airborne vehicle, and (c) a towline connecting the airborne vehicle and the ground-based vehicle.

In other embodiments, the invention is directed to a method of transportation. The method of transportation comprises, using the above-described transportation system, (a) loading passengers and/or cargo into the airborne vehicle and/or the ground-based vehicle, (b) activating the ground-based vehicle, (c) moving and raising the airborne vehicle, (d) lowering and landing the airborne vehicle, and (e) unloading passengers and/or cargo from the airborne vehicle and/or the ground-based vehicle.

In additional embodiments, the invention is directed to a method of transportation. The method of transportation comprises, using the above-described transportation system, (a) loading passengers and/or cargo into the airborne vehicle and/or the ground-based vehicle, (b) raising the airborne vehicle, (c) activating the ground-based vehicle and moving the airborne vehicle, (d) deactivating the ground-based vehicle, (e) lowering airborne vehicle, and (f) unloading passengers and/or cargo from the airborne vehicle and/or the ground-based vehicle.

In further embodiments, the invention is directed to a method of transportation that comprises, using the above-described transportation system driven through a loop moving cable system, (a) activating the loop moving cable system, (b) coupling the ground-based vehicle with the cable of at least one loop moving cable system, (c) moving the ground-based vehicle through the loop moving cable system, (d) switching the ground-based vehicle from one loop to the next loop of the loop moving cable system, (e) decoupling the ground-based vehicle from the cable of the loop moving cable system, and (f) deactivating the loop moving cable system.

In additional embodiments, the invention is directed to a method of transportation that comprises, using the above-described transportation system driven through a loop moving cable system, (a) coupling the ground-based vehicle with the cable of at least one loop moving cable system, (b) activating the loop moving cable system, (c) moving the ground-based vehicle through the loop moving cable system, (d) switching the ground-based vehicle from one loop to the next loop of the loop moving cable system, (e) deactivating the loop moving cable system, and (f) decoupling the ground-based vehicle from the cable of the loop moving cable system.

Also provided is a transportation system comprising a hybrid vehicle that is propelled on a highway by a linear induction electric motor comprising a stationary motor element ("stator") and a moving motor element ("rotor"), wherein the stator is incorporated into a groove in the highway and the rotor is incorporated into the hybrid vehicle and protrudes into the groove in the highway, and wherein the hybrid vehicle further comprises at least one wing that elevates the hybrid vehicle when propelled to a take-off speed on the highway.

Additionally, another method of transportation is provided, which utilizes the hybrid vehicle transportation system described above. The method comprises (a) engaging the linear induction motor, wherein magnetic induction in the rotor causes its propulsion causing the hybrid vehicle to begin accelerating up to a take-off speed and to become elevated by interaction of the at least one wing with air, (b) the elevation causes the rotor to elevate up from the stator bottom in the groove, increasing the gap between the rotor and the stator and the reducing the magnetic flux thru the rotor and hence magnetic induction, (c) the reduction of magnetic induction and hence propulsion causes the hybrid vehicle to slow down and lower, thus reducing the distance between the rotor and the stator and increasing the magnetic flux thru the rotor and hence magnetic induction and propulsion causing the hybrid vehicle to accelerate again and elevate, and (d) repeating (b) and (c) until a dynamic equilibrium between the vehicle's optimal speed and position is achieved.

BRIEF DESCRIPTION OF THE SEVERAL VIEWS OF THE DRAWINGS

The present invention, in accordance with one or more various embodiments, is described in detail with reference to the following figures. The drawings are provided for the purpose of illustration only and depict typical or example embodiments of the invention. These drawings shall not be considered to limit the breadth, scope, or applicability of the invention. It should be noted that for clarity and to facilitate the reader's understanding, these drawings are not necessarily made to scale.

DETAILED DESCRIPTION OF THE INVENTION

Figure 1:
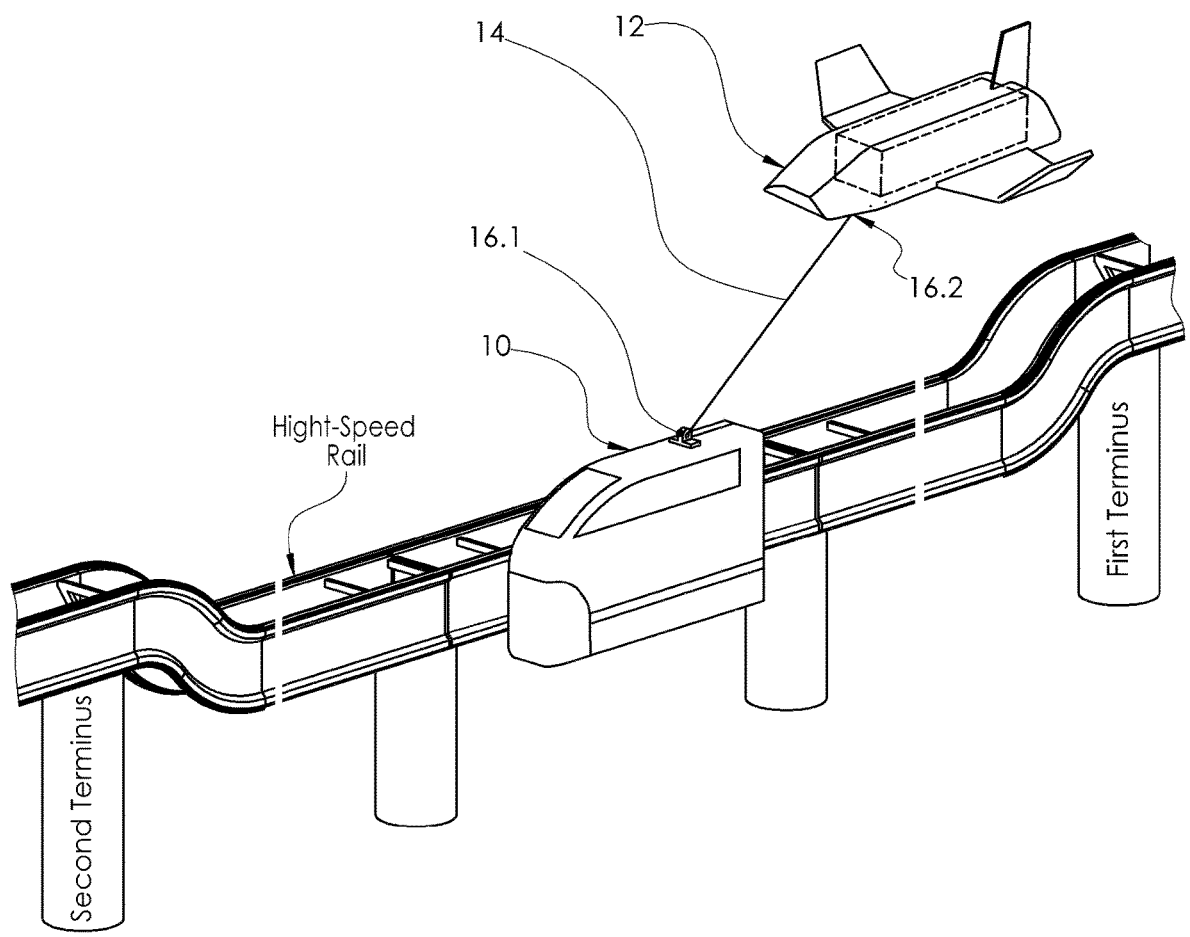
FIG. 1 shows one embodiment of the hybrid air transportation system disclosed herein. It illustrates the operation of the ground vehicle (here a high-speed rail system) towing the airborne vehicle (glider) by use of a towline.

As used herein, the singular forms "a", "an" and "the" are intended to include the plural forms as well, unless the context clearly indicates otherwise. Additionally, the use of "or" is intended to include "and/or", unless the context clearly indicates otherwise.

The present invention is directed to hybrid air transportation systems for transporting passengers or cargo safely, quickly, inexpensively, and in an environmentally friendly way.

These systems all include an airborne vehicle that is connected to the ground, deriving its propulsive force therefrom. In some of these systems, there are two vehicles, a ground-based vehicle and at least one airborne vehicle; in other systems there is only a hybrid vehicle that is airborne but connected to the ground by a rotor inserted into a groove in the ground.

Thus, in some embodiments, the invention is directed to a transportation system. The transportation system comprises (a) a ground-based powered vehicle, (b) at least one airborne vehicle, and (c) a towline connecting the airborne vehicle and the ground-based vehicle.

In certain embodiments, there is one airborne vehicle. In other embodiments there is two, three, four, five, or more airborne vehicles, all connected by either one towline with rigid or flexible branches, or by multiple towlines.

In some of these embodiments, the airborne vehicle comprises at least one wing. In other embodiments, the airborne vehicle comprises two wings (see, e.g., FIGS. 1 and 2). In various embodiments, the airborne vehicle does not comprise a wing, e.g. a blimp (see e.g., FIGS. 3 and 4).

In various embodiments, the ground-based vehicle has a very low profile minimizing its air resistance (drag) while the same air resistance (drag) provides a lift to raise the airborne vehicle, for example, a glider, and maintains it in the air. Such an embodiment transforms air drag, an impediment of the evacuated tube system, into an ally for this system.

Moreover, while eliminating the load from passengers and cargo onto the rail track, the same lift, due to applying some lift fraction to the tug ground vehicle itself, greatly reduces the tug vehicle's load onto the track thus providing for an inexpensive and simple rail track construction and maintenance, contrary to existing high speed train systems. Further, the tug vehicle's load onto the track can be made equal zero or even negative, i.e., directed up if the lift force from the glider is big enough.

Such a combination allows: (a) high speed air travel with extreme safety and the lack of environmental impact, particularly in embodiments where there are no engines and flammable fuel onboard; (b) environmentally friendly electrical propulsion of high speed trains without huge costs of construction and maintenance of rail tracks; and (c) swift and inexpensive development due to complete knowledge and vast demonstrated practice of both proven modes.

Additionally, the minimal radius of turns can be much shorter than other rail-based systems, since vertical acceleration on passengers (due to banking the airborne vehicle's wings) is far more tolerable than side or front/back acceleration on them (compare, e.g., max 0.5 g in side acceleration force in a HyperLoop system, and up to 6 g vertical acceleration force in roller coasters, i.e., the turn radius can be 12 fold shorter).

In the invention systems, there are no direct emissions, noise, or claustrophobia, as can be experienced in a closed tube system. Passengers enjoy a comfortable and quick ride with panoramic window views and flight attendants' service in a contemporary air travel environment, but with no engine noise, let alone elimination of check-in baggage security check, since the baggage can be carried in a separate glider.

In an emergency, the tug ground vehicle may stop and the glider transits to rotational movement around this vehicle until the emergency is over.

Moreover, the glider may have collapsible vertical electrical propellers powered through a cable from the tug vehicle to keep it in the air temporarily, or even make an emergency landing, which is safe due to low landing speed, little mass, and the lack of flammable fuel onboard. The collapsible electrical propellers can be combined with airbags, for example as in automobiles, which can be inflated with a compressed light gas, e.g., helium. In some embodiments, the gas is hidden in the wings until required in an emergency, thus allowing far less power required by the propellers for safe landing.

This system provides a relatively low flight altitude, avoiding cold temperatures and pressurized cabins required for high-altitude air travel. Additionally, the present system is safer than high-altitude air travel since emergency landings are from a lower altitude and at lower speed with no fuel onboard.

The present invention also has cost advantages over high speed rail systems, since it can be built above the ground on pylons thus greatly lessening the need to buy land. Moreover, the number of pylons can be greatly reduced from that required for an evacuated tube system, because the load on a track from the ground-based tug vehicle and the track's own weight is greatly lessened due to the lift force from the airborne vehicle onto the ground vehicle and the track itself. The present invention is not limited to any particular distance between pylons. Since the lift force from the airborne vehicle reduces the load on the track, the distance between pylons can equal or exceed the current maximum span of about 6,000 feet. This distance can be further increased through the use of a strong cable stretched between the pylons, further reducing the weight load from the track onto itself.

Contrary to a HyperLoop system, the present system has an ability to make 12-fold sharper turns, because a glider can bank during a turn, where the acceleration force is directed along passengers' spines, thus greatly enhancing their tolerance limit, such as utilized in a roller coaster, as discussed above. In some embodiments, the towline length is extendable during the turns, which increases the turn radius, thus decreasing the acceleration force.

This system is also resistant to damage from earthquakes, particularly when compared to a high speed rail system or HyperLoop system, due to the flexibility of the towline.

The ground-based vehicle can be manned or unmanned. Additionally, the ground-based vehicle and/or the airborne vehicle can be un-piloted.

In some of these embodiments, the ground-based vehicle is driven by a high-speed rail system or another guided system such as a magnetic levitation system, an air cushion system, or a conveyer system. In additional embodiments, the ground-based vehicle is driven by a cable system, a linear electric motor, an internal combustion engine, and/or any other onboard motor.

In some embodiments, the airborne vehicle is configured to carry at least one passenger and/or cargo. In other embodiments, the ground-based vehicle is configured to carry at least one passenger and/or cargo. In additional embodiments, both the airborne vehicle and the ground-based vehicle are configured to carry at least one passenger and/or cargo. In further embodiments, neither the airborne vehicle nor the ground-based vehicle is configured to carry any passengers or cargo.

In some embodiments, the towline is capable of detaching and reattaching to the airborne vehicle at either or both end links. In other embodiments, the towline is capable of detaching and reattaching from the ground-based vehicle.

In various embodiments, the towline is attached to the ground-based vehicle through a ground link and the towline is attached to the airborne vehicle through an air link. In some of these embodiments, the towline is capable of being lengthened or shortened at the air link and/or the ground link. In some of these embodiments, the air link and/or the ground link may be lengthened or shortened while the airborne vehicle and/or the ground-based vehicle turns. In various embodiments, the towline is made of a flexible material.

In further embodiments, the airborne vehicle contains at least one collapsible powered propeller. In some of these embodiments, the collapsible powered propeller is powered by electricity. In certain of these embodiments, the electricity powering the collapsible powered propeller comes from the ground-based vehicle. In other embodiments, the electricity comes from a ground-based elevated electricity line.

The collapsible powered propeller can be configured any way known in the art, for example in an angled fashion.

In some embodiments, the airborne vehicle contains at least one airbag, configured to be inflated with a compressed gas, e.g., a gas that is lighter than air, for example helium.

The ground-based vehicle can be driven by any means known in the art. In some embodiments, the ground-based vehicle is driven by a motor, e.g., a linear induction electric motor.

In various embodiments, the ground-based vehicle is coupled to and moved by at least one loop moving cable system. Such a loop moving cable system comprises a moving cable circulating through the loop moving cable system, and at least one circular pole and/or wheel at the ends of the loop.

In various embodiments, the cable is moved by at least one rotating powered wheel at an end of the loop and/or at least one linear electrical motor with its stator located along the moving cable and its rotor attached to the moving cable so that the rotor enters in the stator as the cable is moving.

In some embodiments, the ground-based vehicle is propelled on a highway, e.g., an elevated highway with a first and second terminus. In some of these embodiments, the first terminus and/or the second terminus are at a higher elevation than other portions, e.g., adjacent portions, of the route. An elevated first terminus and/or the second terminus is advantageous when the airborne vehicle is a glider, since the glider needs less tow force to reach take-off speed and less braking force to stop at landing due to its gravitation force at the terminus slopes.

The present invention is also directed to a method of transportation. The method comprises, using the above-described transportation system, (a) loading passengers and/or cargo into the airborne vehicle and/or the ground-based vehicle, (b) activating the ground-based vehicle, (c) moving and raising the airborne vehicle, (d) lowering and landing airborne vehicle, and (e) unloading passengers and/or cargo from the airborne vehicle and/or the ground-based vehicle.

The present invention is also directed to another method of transportation. This method of transportation comprises, using the above-described transportation system, (a) loading passengers and/or cargo into the airborne vehicle and/or the ground-based vehicle, (b) raising the airborne vehicle, (c) activating the ground-based vehicle and moving the airborne vehicle, (d) deactivating the ground-based vehicle, (e) lowering the airborne vehicle, and (f) unloading passengers and/or cargo from the airborne vehicle and/or the ground-based vehicle. In some of these embodiments, the airborne vehicle is wingless, such as a blimp (see FIGS. 3 and 4).

Also provided is a method of transportation that comprises, using the above-described loop moving cable system, (a) activating the loop moving cable system, (b) coupling the ground based vehicle with the cable of at least one loop moving cable system, (c) moving the ground-based vehicle through the loop moving cable system, (d) switching the ground-based vehicle from one loop to the next loop of the loop moving cable system, (e) decoupling the ground-based vehicle from the cable of the loop moving cable system, and (f) deactivating the loop moving cable system.

Further provided is method of transportation that comprises, using the above-described loop moving cable system, (a) coupling the ground-based vehicle with the cable of at least one loop moving cable system, (b) activating the loop moving cable system, (c) moving the ground-based vehicle through the loop moving cable system, (d) switching the ground-based vehicle from one loop to the next loop of the loop moving cable system, (e) deactivating the loop moving cable system, and (f) decoupling the ground-based vehicle from the cable of the loop moving cable system.

FIG. 1 illustrates an exemplary transportation system of the present invention. A ground vehicle 10 is connected to an air vehicle 12 through a towline 14. In the illustrated embodiment, the ground vehicle 10 is a high-speed rail vehicle.

In other embodiments, other types of ground transportation systems, such as a train, a tow truck, a levitation system, and so on, is utilized. The ground vehicle 10 may be unmanned or have a cargo or passenger area located inside the ground vehicle 10. The air vehicle 12 in this embodiment is a glider-like aircraft. The air vehicle 12 can be unmanned or have a cargo or passenger area located inside the air vehicle 12.

In most embodiments, the air vehicle 12 does not contain a motor to drive the air vehicle 12, but may contain at least one collapsible propeller attached to the air vehicle 12 where self-sustaining flight is needed, or for an emergency landing. The air vehicle 12 may also contain an inflatable airbag in the event of an emergency landing.

The air vehicle 12 is connected to the ground vehicle 10 through the use of a towline 14. This towline 14 is connected to the ground vehicle 10 through the use of a first coupling link 16.1 and connected to the air vehicle 12 through the use of second coupling link 16.2. The towline 14 may be lengthened or shortened at the first coupling link 16.1 or the second coupling link 16.2 in the event the air vehicle 12 needs to bank or level to make turns.

The towline 14 may also be decoupled at either the first coupling link 16.1 or the second coupling link 16.2 during operation, and subsequently recoupled, allowing the ground vehicle 10 and air vehicle 12 to temporarily be disconnected in the event of the ground vehicle 10 going under a bridge or tunnel or the like.

Figure 2:
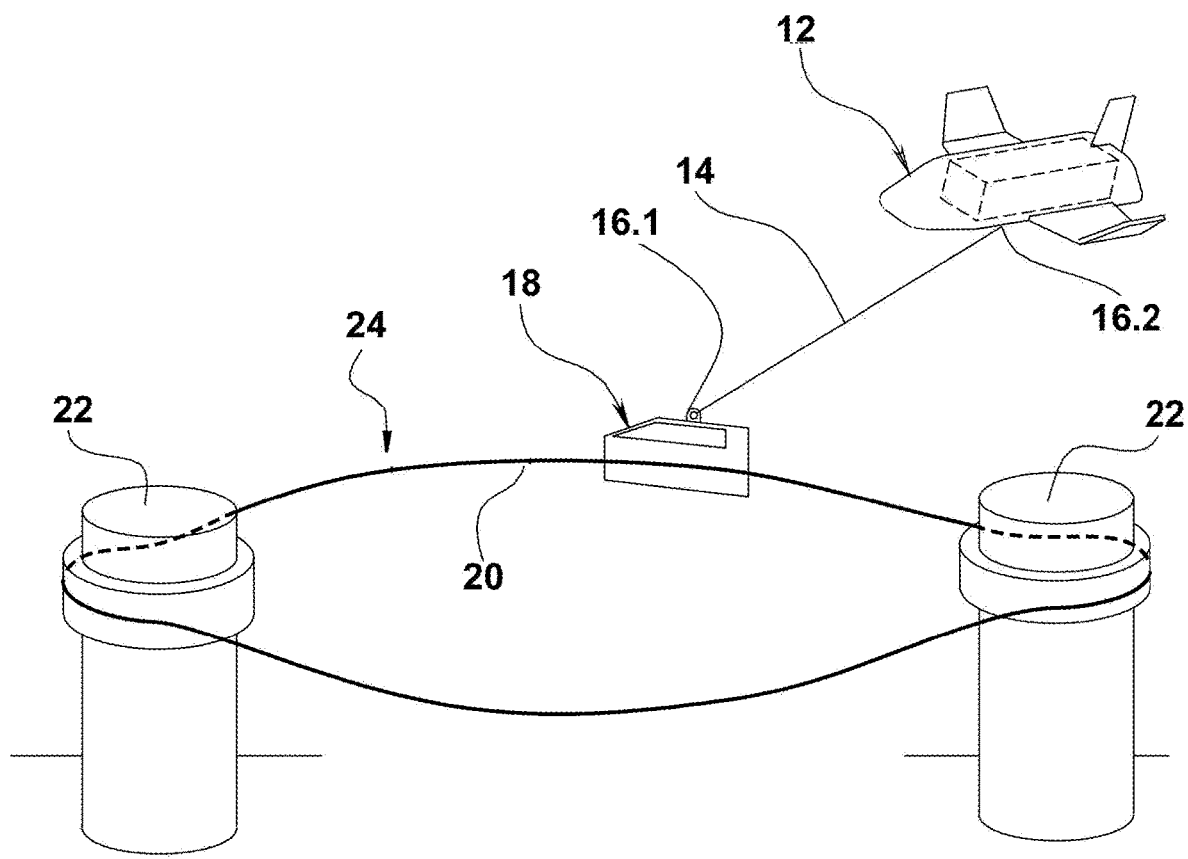
FIG. 2 shows another embodiment of the hybrid air transportation system disclosed herein. It illustrates the operation of the ground-based vehicle (here a loop moving cable system) towing the airborne vehicle (glider) by use of a towline.

Another example of an embodiment is shown in FIG. 2. A ground vehicle 18 is connected to an air vehicle 12 through a towline 14. In this embodiment, the ground vehicle 18 is connected to at least one closed loop cable system 24. The closed loop cable system 24 is a cable 20 driven between at least two stations 22. The system may include more than two stations 22 or more than one cable 20, but this embodiment describes the basic two stations 22, one cable 20, and closed loop cable system 24. The closed loop system 24 is coupled to the ground vehicle 18, which may be manned or unmanned. This connection between the closed loop system 24 and the ground vehicle 18 may be coupled or decoupled while the cable 20 is in motion, or while the cable 20 is stationary.

It is further contemplated that in an embodiment with more than two stations 22 and more than one cable 20, the ground vehicle 18 may be decoupled from one cable 20 and recoupled to a second cable. It is also contemplated that in an embodiment with two or more closed loop cable systems 24, the ground vehicle 18 may be decoupled from one closed loop cable system and recoupled to subsequent loop cable systems.

The ground vehicle 18 coupled to the closed loop cable system 24 is connected to an air vehicle 12 through a towline 14, as in FIG. 1. Also as in FIG. 1, the ground vehicle 18 is connected to the towline 14 through a first coupling link 16.1 and the air vehicle 12 is connected to the towline 14 through a second coupling link 16.2. Also as in FIG. 1, the towline 14 may be lengthened or shortened at the first coupling link 16.1 or the second coupling link 16.2 in the event the air vehicle 12 needs to bank or level to make turns.

The towline 14 may also be decoupled at either the first coupling link 16.1 or the second coupling link 16.2 during operation, and subsequently recoupled, allowing the ground vehicle 18 and air vehicle 12 to temporarily be disconnected in the event of the ground vehicle 18 going under a bridge or tunnel or the like. The air vehicle 12 may also be empty, or have the capacity to carry passengers or cargo.

Also as in FIG. 1, in most embodiments, the air vehicle 12 does not contain a motor to drive the air vehicle 12, but may contain at least one collapsible propeller attached to the air vehicle 12 when self-sustaining flight is needed, or in an emergency landing. The air vehicle 12 may also contain an inflatable airbag in the event of an emergency landing.

Figure 3:
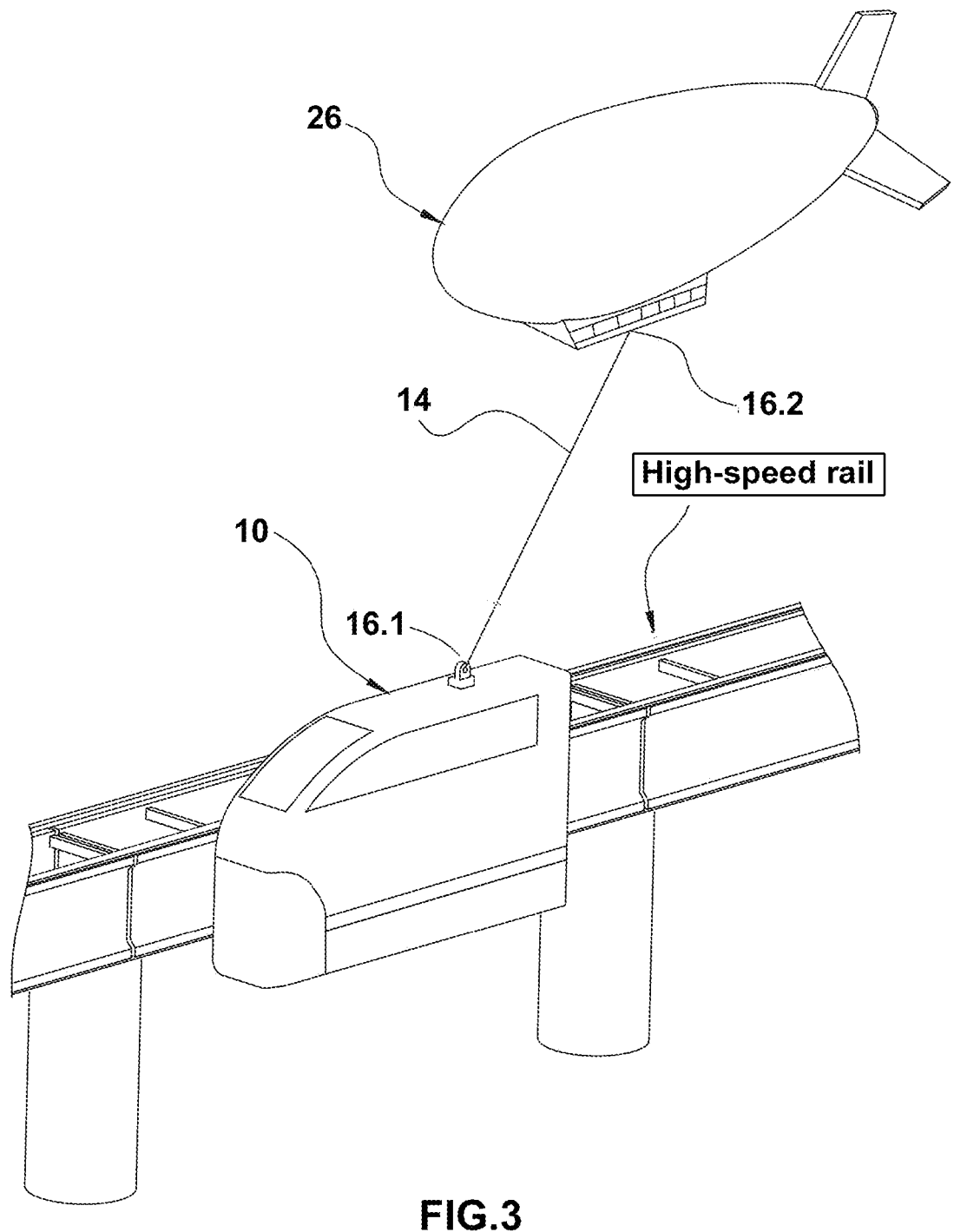
FIG. 3 shows another embodiment of the hybrid air transportation system disclosed herein. It illustrates the operation of the ground-based vehicle (here a high-speed rail system) towing the airborne vehicle (blimp) by use of a towline.
Figure 4:
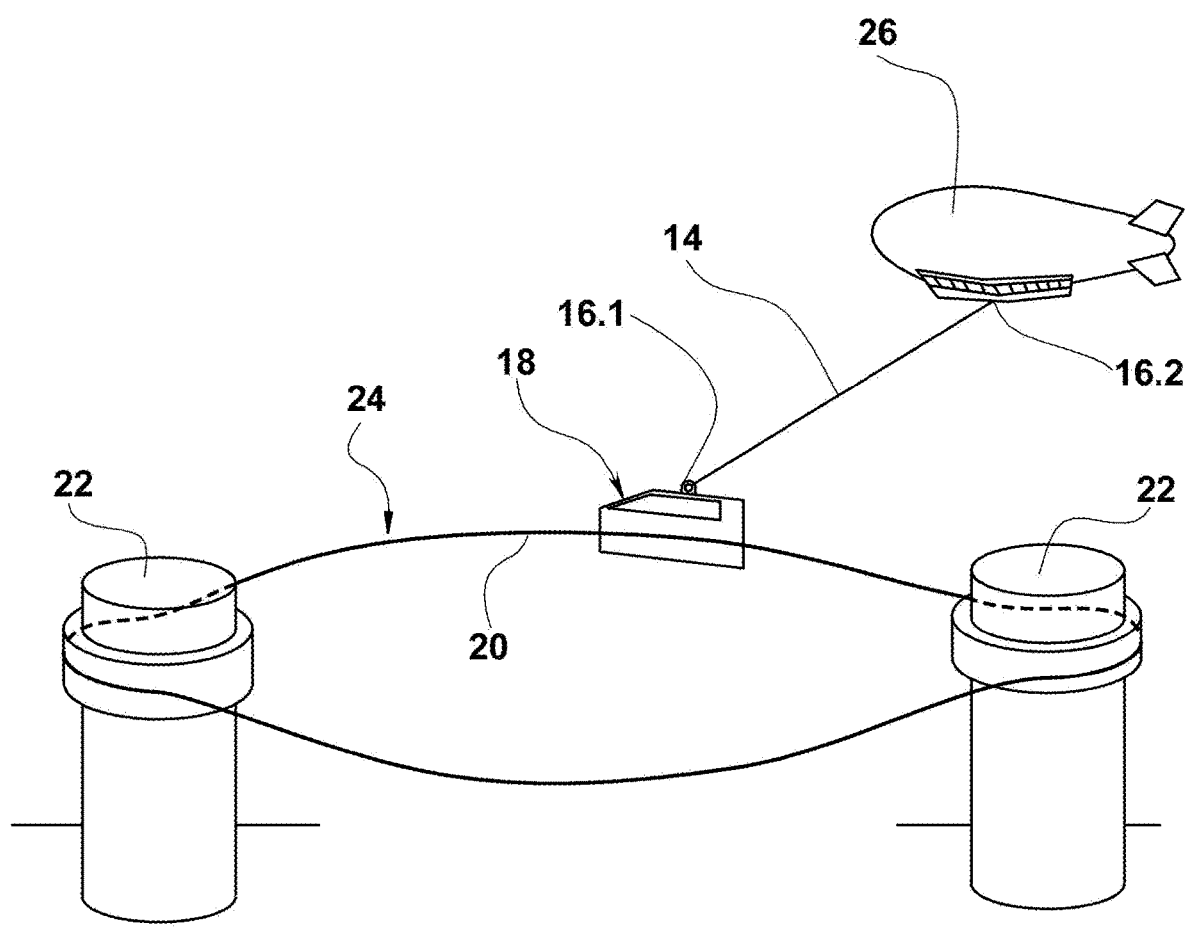
FIG. 4 shows another embodiment of the hybrid air transportation system disclosed herein. It illustrates the operation of the ground-based vehicle (here a loop moving cable system) towing the airborne vehicle (blimp) by use of a towline.

FIGS. 3 and 4 show two other examples of some other embodiments of the transportation system of the present invention. FIG. 3 presents the same ground vehicle 10, towline 14, first coupling link 16.1, and second coupling link 16.2 as FIG. 1, but exhibits a wingless, blimp-like air vehicle 26. The blimp-like air vehicle 26 may be unmanned, or contain cargo or passengers in a cargo or passenger area.

FIG. 4 presents the same ground vehicle 18, closed loop cable system 24, towline 14, first coupling link 16.1, and second coupling link 16.2 as FIG. 2, but exhibits the same wingless, blimp-like air vehicle 26 as FIG. 3. Use of the blimp-like air vehicle 26 in these embodiments allows for the blimp-like air vehicle 26 to be raised and lowered prior to activation of the high-speed rail ground vehicle 10 or the ground vehicle 18 coupled to the closed loop cable system 24.

Figure 5A:
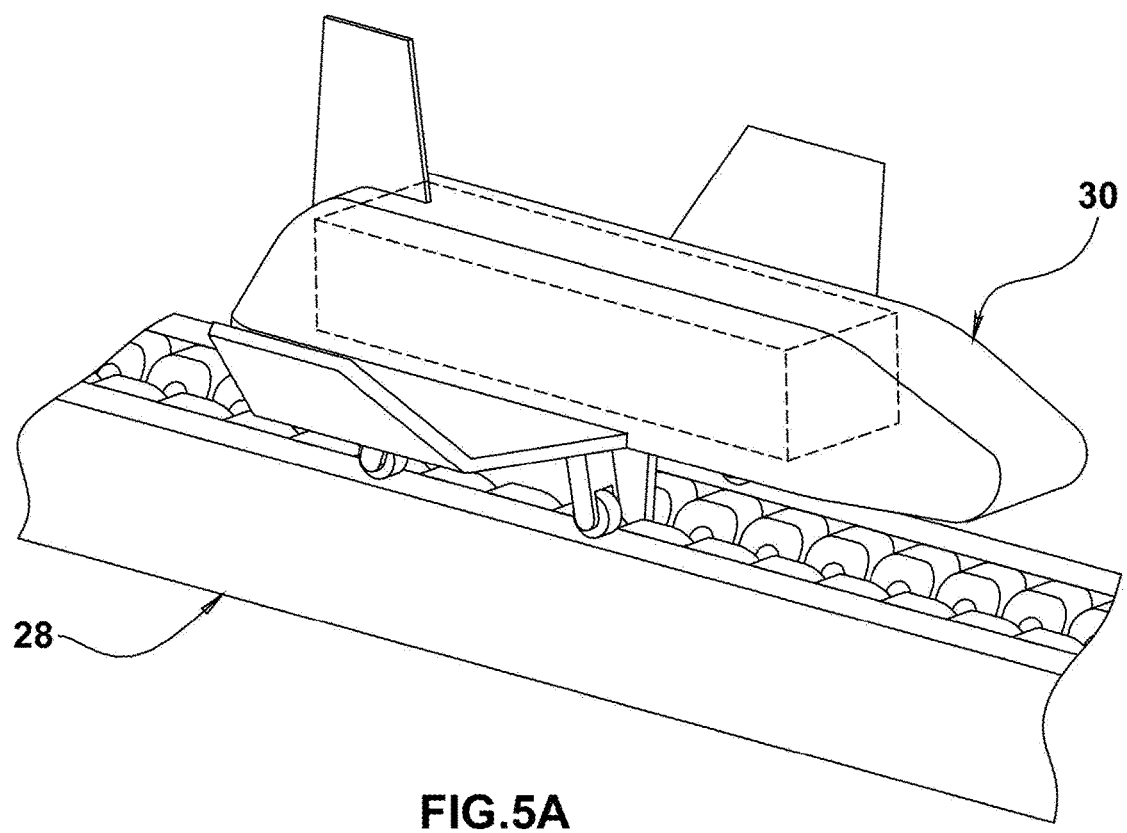
FIGS. 5A and 5B are an illustration of a linear induction electric motor that propels a hybrid vehicle in accordance with various embodiments of the invention.
Figure 5B:
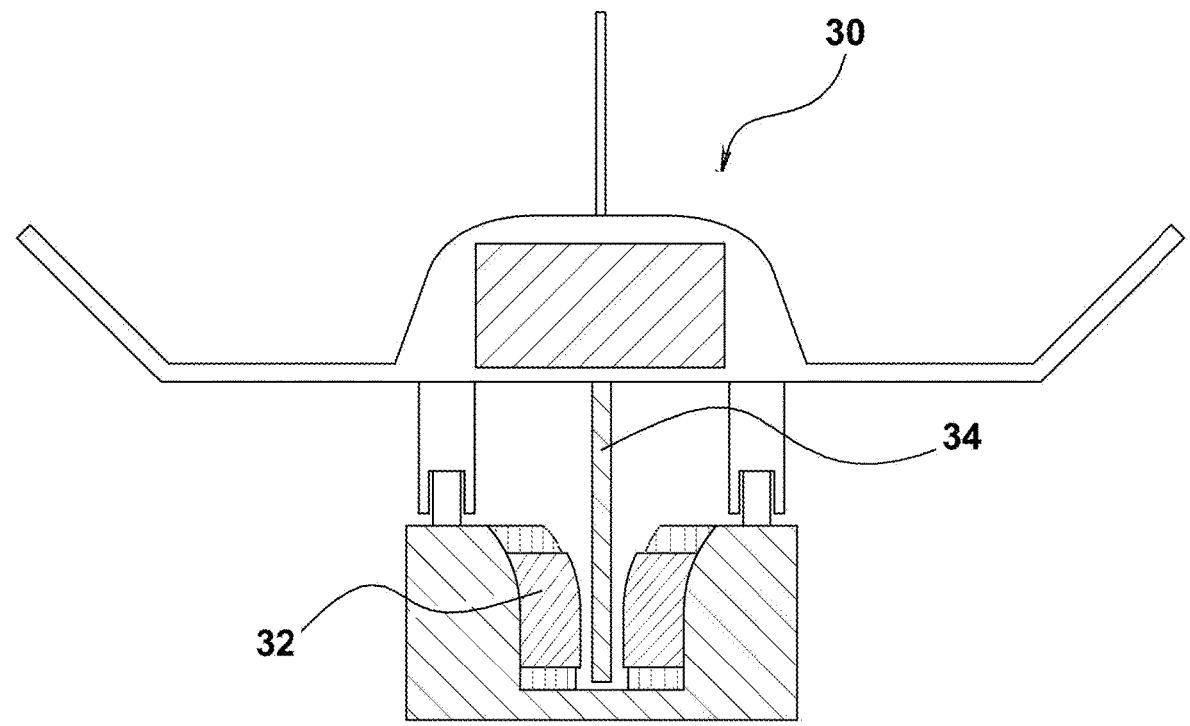

FIGS. 5A and 5B (the cross-sectional view) show a transportation system comprising a hybrid vehicle 30 that is propelled on a highway 28 by a linear induction motor (LIM) comprising a stationary motor element ("stator") 32 and a moving motor element ("rotor") 34, wherein the stator 32 is incorporated in a groove of the highway and the rotor 34 is incorporated into the hybrid vehicle 30 and protrudes into the groove of the highway, and wherein the hybrid vehicle 30 further comprises at least one wing that elevates the hybrid vehicle 30 when propelled to a take-off speed on the highway 28.

An example of a LIM being used to propel a train is provided in U.S. Pat. No. 3,233,559 (incorporated by reference). A LIM on a train consists of an active portion on the train, corresponding to the windings on a conventional motor, and a metal plate on the tracks acting as the stator. When the windings are energized, the magnetic field they produce causes an opposite field to be induced in the plate.

There is a short delay between field and induced field due to hysteresis (the lag in response exhibited by a body in reacting to changes in magnetic force). By carefully timing the energizing of the windings, the fields in the windings and "reaction rail" will be slightly offset due to the hysteresis. That offset results in a net thrust along the reaction rail, allowing the LIM to pull itself along the rail without any physical contact.

In the present invention, the LIM propels the hybrid vehicle 30 through the action of the rotor 34 protruding from the vehicle into a groove in a highway, where the groove has windings that serve as the stator 32. The groove and corresponding rotor can be of any length, e.g., up to 1 meter, 2 meters, 3 meters, 4 meters, 5 meters, 6 meters or longer, for example on an elevated highway.

In some embodiments, the groove top is the same width of the groove bottom. In other embodiments, the groove top is wider than the groove bottom.

Here, propulsion is proportional to the mutual surface area of the conical groove facing the surface area of the rotor protruding therein. Due to this relation, the more mutual surface area, the more propulsion, the more propulsion the more speed, the more speed the more lift from the wings. As the speed increases, the vehicle rises due to increased lift. The increased lift raises the rotor, decreasing the mutual surface area of the rotor interacting with the stator, which decreases the propulsive force, lowering the vehicle. Thus a dynamic equilibrium is maintained, which keeps the vehicle in an optimal constant position and speed in the conical groove.

A conical groove is advantageous due to the linear correlation between the rotor's magnetic area and propulsion and the reverse cubical correlation between the rotor/side gap and the propulsion. If the groove is vertical, the propulsion lessens linearly when the rotor elevates. However, if the groove is conical, the propulsion lessens cubically to the gap increase.

As an example, the lateral forces exerted by the stator on the rotor though low at 0.9 lbf/ft (13 N/m) are inherently stabilizing. This simplifies the problem of keeping the rotor aligned in the air gap. The rotor can be very simple—an aluminum blade 49 ft (15 m) long, 1.5 ft (0.45 m) tall, and 2 in. (50 mm) thick. Current flows mainly in the outer 0.4 in. (10 mm) of this blade, allowing it to be hollow to decrease weight and cost. The gap between the rotor and the stator can be e.g., 0.8 in. (20 mm) on each side. A combination of a vehicle control system and electromagnetic centering forces allows the vehicle to safely enter, stay within, and exit such a precise gap.

In some embodiments, the hybrid vehicle is propelled on a route on a highway, where the route has a first and second terminus, and where the first terminus and/or second terminus are at higher elevation than other, e.g., adjacent portions of the route.

As with the transportation system previously described with a ground-based vehicle and an airborne vehicle, having a higher elevation of the first and/or second terminus reduces both propulsive force to reach take-off speed and braking force to stop at landing due to vehicle's gravitation force applying at the terminus slopes.

In some of these embodiments, the hybrid vehicle contains at least one collapsible powered propeller, e.g., in an angled fashion. In certain embodiments, the collapsible powered propeller is powered by electricity.

Additionally provided herewith is a method of transportation that utilizes the hybrid vehicle described above. The method comprises (a) engaging the linear induction motor, wherein magnetic induction in the rotor causes its propulsion causing the hybrid vehicle to begin accelerating up to a take-off speed and to become elevated by interaction of the at least one wing with air, (b) the elevation causes the rotor to elevate up from the stator bottom in the groove, increasing the gap between the rotor and the stator and the reducing the magnetic flux thru the rotor and hence magnetic induction, (c) the reduction of magnetic induction and hence propulsion causes the hybrid vehicle to slow down and lower, thus reducing the distance between the rotor and the stator and increasing the magnetic flux thru the rotor and hence magnetic induction and propulsion causing the hybrid vehicle to accelerate again and elevate, and (d) repeating (b) and (c) until a dynamic equilibrium between the vehicle's optimal speed and position is achieved. The forces involved in achieving this dynamic equilibrium are discussed above.

REFERENCES

U.S. Pat. No. 3,233,559
U.S. Pat. No. 6,220,543
French Patent App. FR2692858A1

In view of the above, it will be seen that several objectives of the invention are achieved and other advantages attained.

As various changes could be made in the above methods and compositions without departing from the scope of the invention, it is intended that all matter contained in the above description and shown in the accompanying drawings shall be interpreted as illustrative and not in a limiting sense.

All references cited in this specification are hereby incorporated by reference. The discussion of the references herein is intended merely to summarize the assertions made by the authors and no admission is made that any reference constitutes prior art.

Applicants reserve the right to challenge the accuracy and pertinence of the cited references.

What is claimed is:

1. A transportation system comprising a hybrid vehicle that is propelled on a highway by a linear motor comprising a stationary motor element ("stator") and a moving motor element ("rotor"), wherein the stator is incorporated into a groove in the highway and the rotor is incorporated into the hybrid vehicle and protrudes into the groove in the highway; wherein the hybrid vehicle further comprises at least one wing that elevates the hybrid vehicle above the highway when propelled to a take-off speed on the highway, holds the hybrid vehicle in the air above the highway when traveling, and lands the hybrid vehicle onto the highway when slowed down to a landing speed.

2. The transportation system of claim 1, wherein a groove is the same width and/or the groove top is wider than the groove bottom.

3. A method of transportation, the method utilizing the transportation system of claim 1, the method comprising (a) engaging the linear induction motor, wherein magnetic induction in the rotor causes its propulsion causing the hybrid vehicle to begin accelerating up to a take-off speed and to become elevated by interaction of the at least one wing with air, (b) the elevation causes the rotor to elevate up from the stator bottom in the groove, increasing the gap between the rotor and the stator and the reducing the magnetic flux thru the rotor and hence magnetic induction, (c) the reduction of magnetic induction and hence propulsion causes the hybrid vehicle to slow down and lower, thus reducing the distance between the rotor and the stator and increasing the magnetic flux thru the rotor and hence magnetic induction and propulsion causing the hybrid vehicle to accelerate again and elevate, and (d) repeating (b) and (c) until a dynamic equilibrium between the vehicle's optimal speed and position is achieved.

4. The transportation system of claim 1, wherein the hybrid vehicle is unmanned, or un-piloted.

5. The transportation system of claim 1, wherein the hybrid vehicle is propelled on a route on a highway, wherein the route has a first terminus and a second terminus, wherein the first terminus and second terminus are at a higher elevation than adjacent portions of the route.

6. The transportation system of claim 1, wherein the highway structure comprising a stationary motor element ("stator") is supported by at least one stretched cable.

* * * * *